United States Patent [19]

Palombari

[11] 3,725,593

[45] Apr. 3, 1973

[54] PCM TELECOMMUNICATION SYSTEM WITH STANDBY CLOCK

[75] Inventor: Maurizio Palombari, Milan, Italy

[73] Assignee: Societe Italiana Telecommunicaziani Siemens, S.p.A., Milano, Italy

[22] Filed: Feb. 22, 1972

[21] Appl. No.: 228,000

[30] Foreign Application Priority Data

Feb. 22, 1971 Italy ............................20861 A/71

[52] U.S. Cl. ..........179/15 BF, 179/175.2 C, 307/64, 307/219

[51] Int. Cl. ............................................H04j 3/14

[58] Field of Search......179/15 BS, 15 AL, 15 BF, 179/175.2 R, 175.2 C; 307/208, 219, 64

[56] References Cited

UNITED STATES PATENTS

| | | | |
|---|---|---|---|
| 3,519,750 | 7/1970 | Beresin | 179/15 AL |
| 3,289,097 | 11/1966 | Martin | 307/219 |
| 3,329,905 | 7/1967 | Niertit | 307/219 |
| 3,628,158 | 12/1971 | Sjoquist | 307/208 |

*Primary Examiner*—Kathleen H. Claffy
*Assistant Examiner*—David L. Stewart
*Attorney*—Karl F. Ross

[57] ABSTRACT

At a main terminal connected to a remote terminal by way of a PCM signal path, a master clock controls the multiplexing of incoming messages from local lines for transmission over an outgoing line of that path to the remote terminal in a bipolar code enabling extraction of the clock frequency at the remote terminal. A discriminator at the main terminal continuously checks the operation of the master clock and, if that operation is normal, causes the transmission of a verification bit over the outgoing line to the remote terminal in an assigned time slot of a service channel of a period message frame; at the remote terminal, a detector responds to either the absence of the verification bit or the nonarrival of message signals to activate a standby clock controlling the sending of composite messages to the main terminal over an incoming line of the signal path. An extractor at the main terminal, connected to that incoming line, delivers the reconstituted pulses of the standby clock to the multiplexer in lieu of the output of the master clock if the latter operates improperly or not at all, as determined by the associated discriminator; a similar discriminator at the remote terminal may insert a corresponding verification bit into a service slot of a message frame transmitted to the main terminal to establish the correct functioning of the standby clock.

7 Claims, 6 Drawing Figures

PCM TELECOMMUNICATION SYSTEM WITH STANDBY CLOCK

My present invention relates to a telecommunication system of the pulse-code-modulated (PCM) type wherein coded messages are transmitted between two terminals over a two-way signal path.

In such systems it is convenient to provide at one terminal, hereinafter referred to as the main terminal, a master clock emitting a train of locally generated timing pulses which control the coding of the outgoing messages and may also be used in the decoding of incoming messages. At the other, remote terminal, these clock pulses may be reconstituted by an extractor determining the rhythm, i.e. the basic pulse cadence of the modulating code, from the arriving message signals; this replica of the output of the master clock is then used to control the coding of messages sent back to the main terminal.

The extraction of the basic pulse cadence is particularly simple if the transmitted messages are coded in the form of bipolar pulses, with short pulses of either polarity separated by gaps of zero voltage. Bits of binary values "1" and "0", or "marks" and "spaces", may then be represented by pulses of different polarities. Thus, a rectification network at the receiving terminal can convert all these code pulses into a unipolar pulse train having a cadence or repetition frequency of the original clock pulses.

In such a system therefore, the basic pulse cadence of outgoing and incoming messages (as seen from the main terminal) is the same, which facilitates decoding.

Since the locally generated clock pulses control the coding and possibly the decoding operations at both terminals, any malfunction or nonfunction of the master clock will affect the quality of transmission in both directions or prevent such transmission altogether; the same is true in the case of transmission failure in the outgoing branch or in a repeater inserted in that branch.

The object of my invention, therefore, is to provide a source of substitute clock pulses in such a system to replace the pulses normally generated by the master clock upon the occurrence of such defects.

This object is realized, in accordance with my present invention, by the provision of a discriminator circuit at the main terminal which monitors the operation of the master clock and emits a consent signal under normal conditions, i.e. if that clock operates properly. In that event, the pulse-cadence extractor at the remote terminal controls the coding of return messages in the aforedescribed manner, so that a similar extractor at the main terminal generates a train of substitute clock pulses in the same rhythm. These substitute clock pulses are, however, not utilized under normal conditions, a switching circuit controlled by the discriminator directing the output of the master clock to the coder for outgoing messages (and if desired to the decoder for incoming messages) while the remote extractor feeds the reconstituted clock pulses to its associated coder. A detector at the remote terminal determines the presence of a recurrent verification code, such as a single bit in a predetermined time slot of a periodic message frame, accompanying the coded signals transmitted from the main terminal; this verification code is inserted in the message frame by the coder of the main terminal in response to the consent signal from the discriminator and is therefore absent if the master clock operates improperly or not at all. If the verification code is not received at the remote terminal, the detector operates another switching circuit to activate a normally blocked standby clock whose output then controls the coder of that terminal whereby the substitute pulse train generated by the extractor at the main terminal assumes a cadence corresponding to the operating frequency of the standby clock. Owing to the absence of the consent signal normally produced by the discriminator, the switching circuit of the main terminal replaces the output of the master clock with this substitute pulse train in controlling the operation of the associated coder.

According to a more specific feature of my invention, the detector at the remote terminal also responds to the sustained absence of signal transmission from the main terminal in order to unblock the standby clock. For this purpose the detector may be connected to the remote decoder by two leads which are respectively energized by arriving message signals and by the accompanying verification code; unless both these leads are properly energized, the standby clock is activated.

In the type of telecommunication system for which the present improvement is particularly intended, the coder at each terminal comprises a multiplexer which conventionally synthesizes a composite message from individual PCM messages arriving over respective groups of local lines, the associated decoder including a demultiplexer directing respective constituents of a composite message to the local lines for which they are destined. In such a system, the periodic message frame may be divided into a plurality of channels of several time slots each, assigned to respective local lines, along with a multislot service channel which may be used for the transmission of supervisory information such as the addresses of the transmitting lines and which may carry the verification bit in one of its time slots.

The above and other features of my invention will be described in detail hereinafter with reference to the accompanying drawing in which.

Figure 5:
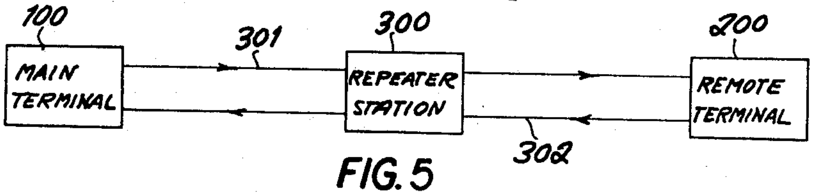
FIG. 5 is a schematic view of the overall system with its two terminals and the intervening signal path.

Reference will first be made to FIG. 5 showing the overall system as including a main terminal 100, a remote terminal 200 and a repeater station 300 therebetween, this repeater station being representative of any number of such stations connected in tandem. The signal path interconnecting terminals 100 and 200 comprises an outgoing branch 301 and an incoming branch 302 as seen from the main terminal; these branches may be constituted by respective two-wire lines.

Figure 1:
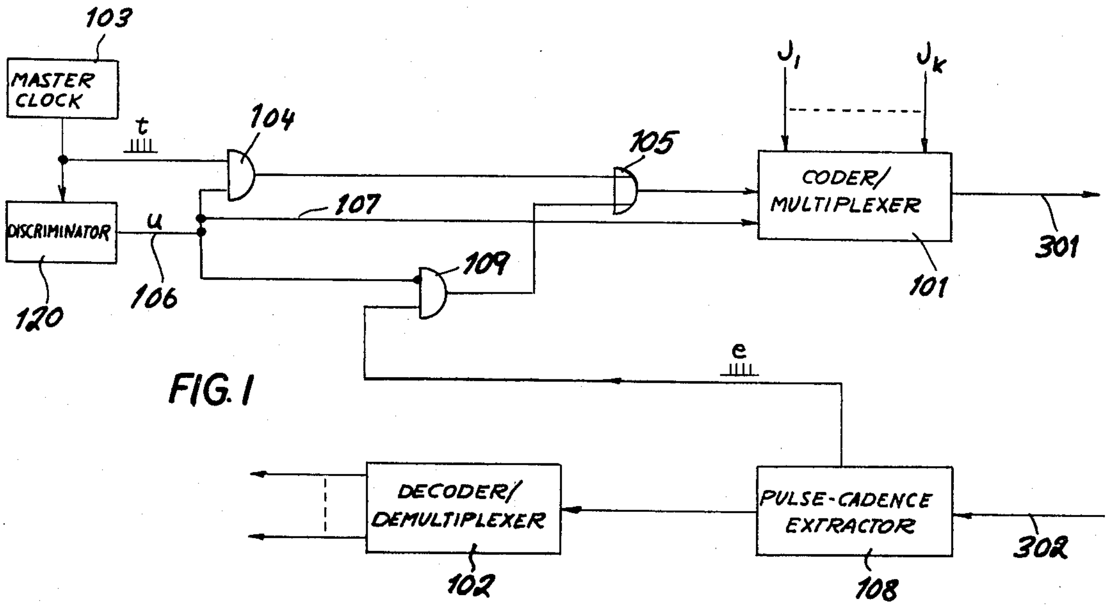
FIG. 1 is a block diagram of a main terminal in a PCM telecommunication system embodying my invention.
Figure 6:
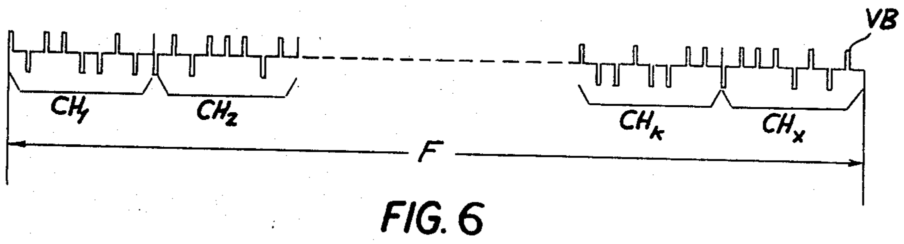
FIG. 6 is a graph showing a message frame transmitted over that signal path.

Details of main terminal 100 are shown in FIG. 1. This terminal forms the junction of a plurality of incoming local lines $J_1 \ldots J_k$, working into a coder/multiplexer 101, and of a like plurality of outgoing lines $B_1 \ldots B_k$ served by a decoder/demultiplexer 102. The individual PCM messages from lines $J_1 - J_k$, in the form of unipolar binary pulses, are interleaved word-by-word by the coder 101 to synthesize a message frame F as shown in FIG. 6; this frame, to be transmitted over outgoing line 301, consists of $k$ message channels $CH_1 \ldots CH_k$ and a service channel $CH_x$. In the illustrated example, each channel is composed of eight bit positions or time slots.

Decoder 102 has the complementary task of distributing the words of the several channels $CH_1 - CH_k$ to the respective addressees $B_1 - B_k$, again in the form of unipolar binary pulses. Such multiplexers and demultiplexers are, of course, well known, per se.

The operation of coder 101 is normally controlled by a master clock 103 generating a train of timing pulses $t$ which are fed to the coder through an AND gate 104 and an OR gate 105 in series therewith. A discriminator 120, more fully described hereinafter with reference to FIG. 3, determines whether the clock 103 operates correctly, i.e. whether the pulses $t$ recur with a predetermined cadence, and in that event generates a consent signal $u$ on a lead 106 also connected to an input of AND gate 104. A branch 107 of lead 106 extends directly to coder 101 which, in the energized state of that lead, inserts into the frame F of FIG. 6 a verification bit VB in the No. 8 time slot of service channel $CH_x$.

Figure 2:
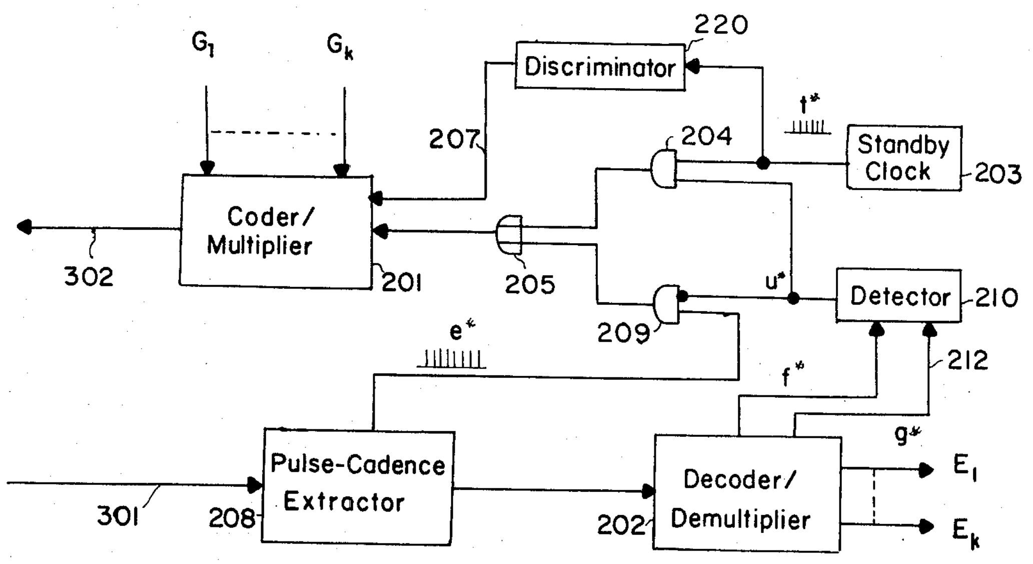
FIG. 2 is a similar block diagram for a remote terminal of the same system.

A pulse-cadence extractor 108, in circuit with incoming line 302 ahead of decoder 102, rectifies the arriving message pulses to generate a pulse train $e$ normally having the rhythm of pulse train $t$. This is so because, at terminal 200 shown in FIG. 2, a similar extractor 208 connected to line 301 regenerates the original pulse train $t$ in the form of a pulse sequence $e^*$ which is then fed through an AND gate 209 and an OR gate 205 to a coder/multiplexer 201 serving a set of local lines $G_1 \ldots G_k$; coder 201 thereupon transmits over line 302 a composite message, with frames similar to that shown in FIG. 6, at the pulse rate established by master clock 103.

The output $e$ of extractor 108 is normally stopped at an AND gate 109 having an inverting input connected to lead 106 so as to be blocked in the presence of consent signal $u$. AND gate 109, when conducting, works into coder 101 through the OR gate 105.

A standby clock 203 at terminal 200 is monitored by a discriminator 220 feeding the coder 201 via a lead 207. Clock 203 generates timing pulses $t^*$ whose cadence is preferably similar to but not necessarily identical with that of pulses $t$ in FIG. 1. As long as clock 203 operates properly, discriminator 220 causes the insertion of a verification bit VB in each frame of the message transmitted via line 302 to terminal 100; at the latter terminal, decoder 102 may generate an alarm signal if the bit VB is absent, thereby alerting an operator to the need for checking the standby clock 203 at the far end of signal path 301, 302.

A decoder/demultiplexer 202 at terminal 200, connected to line 301 downstream of extractor 208, feeds a set of local lines $E_1 \ldots E_k$ and also generates voltages $f^*$ and $g^*$ on two leads 211, 212 extending to a detector 210 more fully described below with reference to FIG. 4. This detector has an output lead 206 carrying an unblocking signal $u^*$ whenever the voltage level on leads 211 and/or 212 goes to zero. Voltage $f^*$ on lead 211 disappears whenever message pulses fail to arrive over line 301 for a predetermined period; similarly, voltage $g^*$ on lead 212 goes to zero whenever these message pulses are not accompanied by the verification bit VB. Pulse train $t^*$ and unblocking signal $u^*$ are applied to respective inputs of an AND gate 204 connected to coder 201 by way of OR gate 205; lead 206 is further connected to an inverting input of AND gate 209. Thus, during normal operation of the system, the absence of signal $u^*$ on lead 206 holds the gate 209 open for the passage of the reconstituted pulse train $e^*$ to coder 201, to the exclusion of the output pulses $t^*$ of clock 203; upon transmission failure, or a malfunction of clock 103 at the main terminal, the appearance of signal $u^*$ causes the pulse train $t^*$ to be substituted for the train $e^*$ in the input of coder 201.

Figure 3:
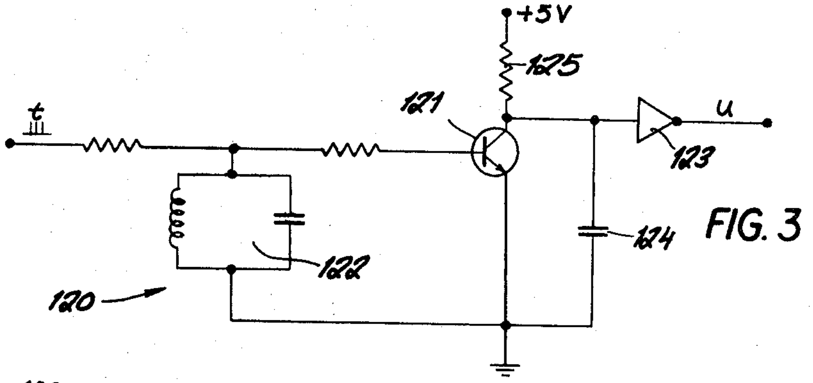
FIG. 3 is a circuit diagram of one of the components of the terminal shown in FIG. 1.

As shown in FIG. 3, discriminator 1020 (as well as the identically constructed discriminator 220) comprises a transistor 121 with a parallel-resonant circuit 122 in its input. Clock pulses $t$ are normally fed to the base of transistor 121 at a cadence corresponding to the resonant frequency of circuit 122 which has a high impedance at that frequency. Thus, transistor 121 is saturated and its collector potential is substantially zero; an inverter 123 transforms this low potential into an elevated voltage of binary value "1" constituting the consent signal $u$. If, however, the pulses $t$ fail to appear for a certain period determined by the time constant of an RC circuit represented by a capacitor 124 and a resistor 125 connected to the collector lead, the collector potential rises to a level which causes the disappearance of signal $u$. The same is true if the clock 103 falls out of step, i.e. if the cadence of pulses $t$ deviates significantly from the resonant frequency of circuit 132 so that this circuit effectively shunts the pulses to ground.

Figure 4:
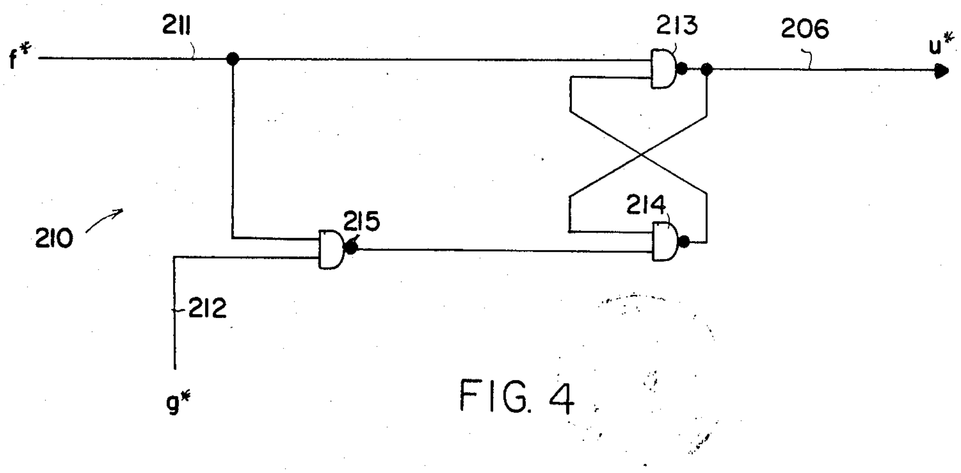
FIG. 4 is a circuit diagram of one of the components of the terminal shown in FIG. 2.

FIG. 4 shows the detector 210 as comprising a flip-flop formed from two cross-connected NAND gates 213, 214, the free input of gate 213 being tied to lead 211 which also works into a NAND gate 215 feeding the free input of gate 214. Lead 212 terminates at the second input of gate 215 which is therefore cut off as long as both leads 211 and 212 are energized in the presence of signal $f^*$ and $g^*$, respectively. In that case the flop-flop stage 213 is blocked so that its output lead 206 is at zero potential.

If signal $g^*$ disappears, gate 215 has a finite output regardless of the value of signal $f^*$ so that the flip-flop is switched and its stage 213 become conductive, generating the unblocking signal $u^*$ on lead 206. Such a switch also occurs upon the disappearance of signal $f^*$ regardless of the state of energization of lead 212. Signal $u$ will come into existence in the event of a line or repeater failure severe enough to result in a substantial reduction of the cumulative pulse energy as integrated over a frame period, even if the bit VB giving rise to signal $g^*$ is still received. Conversely, the prolonged absence of bit VB (as determined by a suitable integrator in the decoder 202) switches the flip-flop 213, 214 even if the line is intact, i.e. if the malfunction originates at the master clock 103.

If the master clock 103 fails and the standby clock 203 is unblocked or activated, coder 101 responds to the substitute pulses *e* in the same manner as previously to the clock pulses *t* except that the bit VB is not generated, i.e. the polarity of the corresponding code pulse of frame *f* is reversed. This maintains the active condition of clock 203 until such time as clock 103 is restored to normal operation.

We claim:

1. In a telecommunication system including a main terminal, a remote terminal, a signal path interconnecting said terminals for two-way transmission of pulse-code-modulated messages thereover with a predetermined basic pulse cadence, first coding means at said main terminal for the transmission of messages to said remote terminal over an outgoing branch of said path, first decoding means at said main terminal for the reception of messages from said remote terminal over an incoming branch of said path, second coding means at said remote terminal for the transmission of messages to said main terminal over said incoming branch, and second decoding means at said remote terminal for the reception of messages from said main terminal over said outgoing branch, the combination therewith of:

a master clock at said main terminal normally emitting a continuous train of locally generating pulses timing the operation of said first coding means;

discriminator means at said main terminal connected to said master clock for monitoring the operation thereof and emitting a consent signal under normal conditions;

first extractor means at said main terminal connected to said incoming branch for determining the basic pulse cadence of messages received thereover from said remote terminal and for generating therefrom a train of substitute clock pulses;

first switch means at said main terminal controlled by said discriminator means for normally directly said locally generated pulses to said first coding means and for replacing said locally generated pulses by said substitute clock pulses to control the operation of said first coding means in the absence of said consent signal;

circuit means connecting said discriminator means to said first coding means for inserting a recurrent verification code in a message transmitted to said remote terminal in the presence of said consent signal;

a normally blocked standby clock at said remote terminal operable in a rhythm approximating that of said mater clock;

detector means at said remote terminal connected to said decoding means for determining the presence of said verification code in a message received from said main terminal;

second extractor means at said remote terminal connected to said outgoing branch for determining the basic pulse cadence of messages received thereover from said main terminal and for generating therefrom a replica of said locally generated pulses; and second switch means at said remote terminal responsive to said detector means for normally directing the pulses generated by said second extractor means to said second coding means for controlling the operation thereof, said second switch means being effective in the absence of said verification code to unblock said standby clock and to substitute the output thereof for the pulses generated by said second extractor means to control said second coding means.

2. The combination defined in claim 1 wherein the connection between said second decoding means and said detector means comprises two leads respectively energized by message signals arriving at normal rate over said outgoing line and by said verification code accompanying said message signals, said second switch means being effective to unblock said standby clock upon de-energization of at least one of said leads.

3. The combination defined in claim 1 wherein said discriminator means comprises a resonant circuit tuned to a frequency corresponding to said predetermined pulse cadence.

4. The combination defined in claim 1, further comprising other discriminator means at said remote terminal connected to said standby clock and to said second coding means for inserting a verification code in a message transmitted to said main terminal upon proper orientation of said standby clock.

5. The combination defined in claim 1 wherein said first and second coding means are generators of bipolar message signals, said first and second extractor means including rectifiers for converting said bipolar message signals into unipolar pulse sequences.

6. The combination defined in claim 1 wherein said terminals are the junctions of respective groups of local lines, said first and second coding means including multiplexers for synthesizing a composite message from individual messages received from the associated local lines, said first and second decoding means including demultiplexers for directing responsive constituents of said composite message to the associated local lines.

7. The combination defined in claim 6 wherein each composite message comprises a recurrent frame divided into a plurality of channels of several time slots each, assigned to respective local lines, and a service channel containing said verification code in a time slot thereof.

* * * * *

FO-1050
(5/69)

UNITED STATES PATENT OFFICE

CERTIFICATE OF CORRECTION

Patent No. 3,725,593 Dated 3 April 1973

Inventor(s) Maurizio PALOMBARI

It is certified that error appears in the above-identified patent and that said Letters Patent are hereby corrected as shown below:

For the name of the Assignee at line 73 of the heading read --Societa Italiana Telecomunicazione Siemens S.P.A.--

Signed and sealed this 2nd day of July 1974.

(SEAL)
Attest:

EDWARD M.FLETCHER,JR.
Attesting Officer

C. MARSHALL DANN
Commissioner of Patents